Dec. 27, 1932.                E. C. CURTIS                 1,892,186
                        PRODUCTION OF ARGON AND NEON
                    Filed Nov. 7, 1930        2 Sheets-Sheet 1
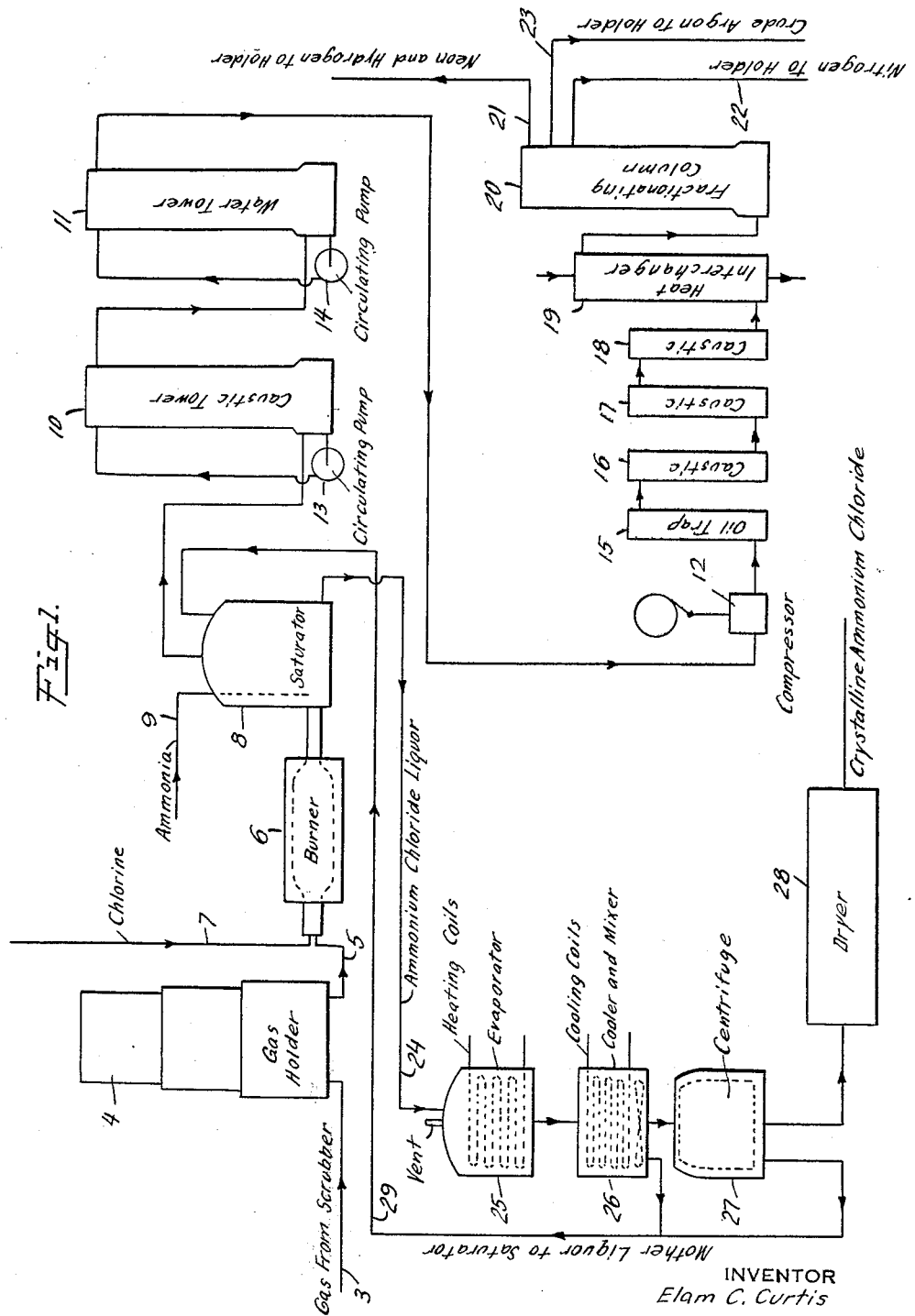
INVENTOR
Elam C. Curtis
BY
Pennie, Davis, Marvin and Edmonds.
ATTORNEYS

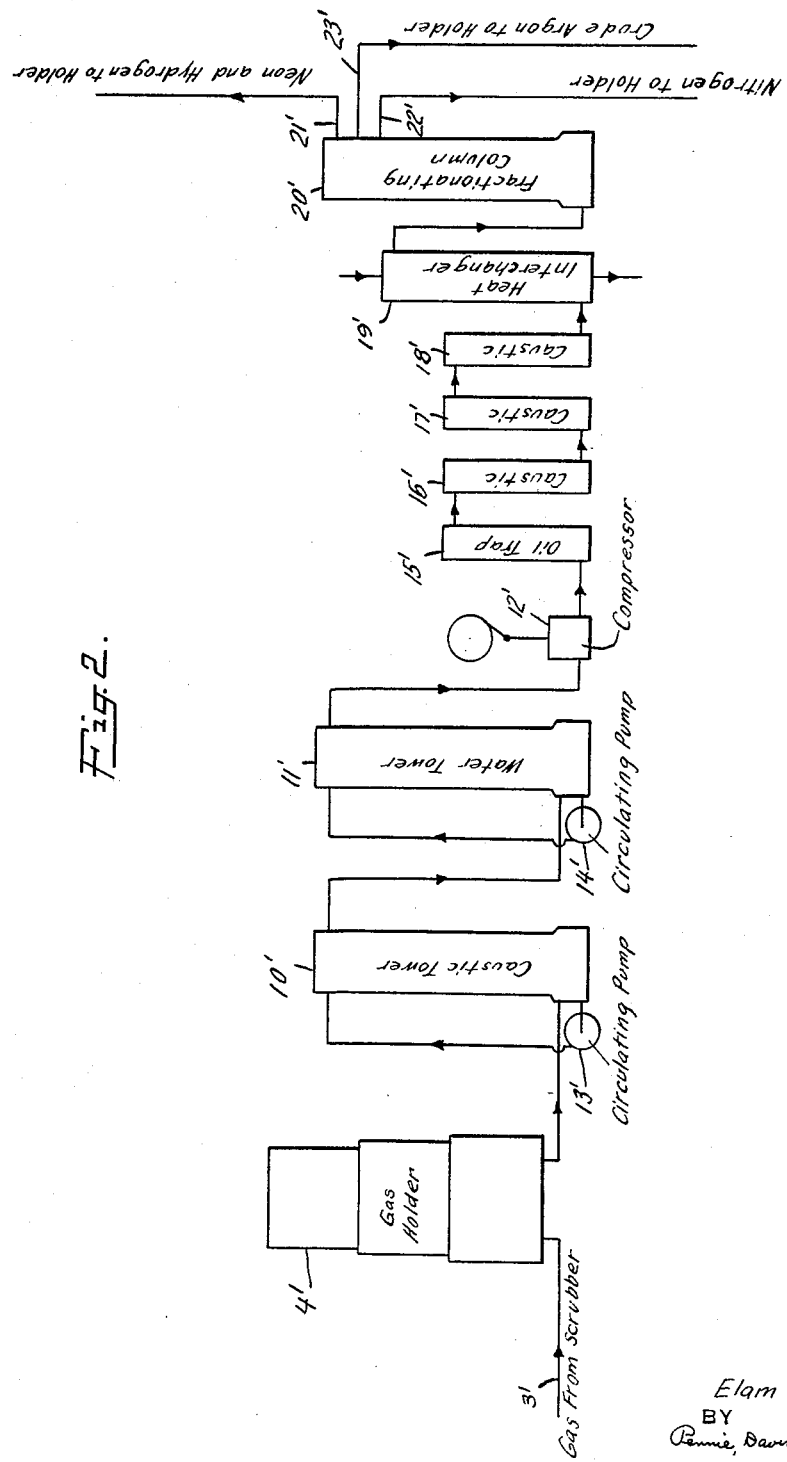

Patented Dec. 27, 1932

1,892,186

UNITED STATES PATENT OFFICE

ELAM C. CURTIS, OF NIAGARA FALLS, NEW YORK, ASSIGNOR TO THE MATHIESON ALKALI WORKS, OF NEW YORK, N. Y., A CORPORATION OF VIRGINIA

PRODUCTION OF ARGON AND NEON

Application filed November 7, 1930. Serial No. 493,962.

This invention relates to improvements in the production of argon and neon or either of them as by-products of the synthesis of ammonia from atmospheric nitrogen. The atmosphere contains small amounts of argon and smaller amounts of neon, but these gases appear in increased concentrations in the discharged waste gases in the synthesis of ammonia from atmospheric nitrogen. Such waste gases are discharged from the synthesis system, continuously usually, to "purge" the system, that is to prevent such accumulation of inert constituents, such as argon and neon, in the system as would interfere with the synthesis and are released from solution in the liquefied ammonia product when the pressure upon the liquid ammonia is reduced. Such effluent gases are usually passed together through a water scrubber for the recovery of any ammonia they contain, and small amounts of oxygen and carbon dioxide, from the scrubbing water, are usually added to the gas mixture in this operation. The final effluent gases may comprise, for example, 65% of hydrogen, 30% of nitrogen, 3+% of argon, 1+% of oxygen, carbon dioxide and ammonia, and a trace of neon. This invention provides improvements in the recovery of argon and neon or either of them from such gas mixtures.

In general, the present invention comprises circulating the residual gas mixture remaining after separation of ammonia and containing hydrogen, nitrogen, argon and neon through a compressor and a cooler to a fractionating column, compressing and cooling the gas mixture to liquefy the argon and nitrogen and separating an argon concentrate from the nitrogen and from a mixture containing hydrogen and neon in the fractionating column. The mixture of hydrogen and neon from the fractionating column may be recirculated through the ammonia synthesis to increase the concentration of neon in this mixture and the neon may be recovered from this mixture by burning hydrogen out of the mixture, with oxygen for example, or the neon content of the mixture of hydrogen and neon from the fractionating column may be liquefied and recovered from the mixture by fractionation. In one particularly advantageous embodiment of the invention, hydrogen is burned out of the residual gas mixture remaining after separation of the ammonia and containing hydrogen, nitrogen, argon and neon with chlorine and the hydrochloric acid so produced is separated from the resulting gas mixture before the latter is compressed and cooled. The hydrochloric acid so produced may be separated from the gas mixture by combination with ammonia to produce recoverable ammonium chloride.

The invention will be further described in connection with the accompanying drawings which illustrate, diagrammatically and generally in the manner of a flow sheet, two embodiments of the invention, one in Fig. 1 and another in Fig. 2.

Referring to Fig. 1, the residual gas mixture remaining after separation of ammonia following the ammonia synthesis is supplied through connection 3 to the gas holder 4. This gas mixture is supplied from the gas holder 4 through the connection 5 to the burner 6 together with chlorine supplied through connection 7 in amount approximately equivalent, chemically, to the hydrogen content of the gas mixture supplied through connection 5. This chlorine and the hydrogen of the gas mixture combine, in the burner 6, to form hydrochloric acid which is removed from the gas mixture in the saturator 8 by combination with ammonia supplied through connection 9 in amount equivalent, chemically, to the hydrochloric acid content of the gas mixture. Water in amount sufficient to dissolve the ammonium chloride formed is supplied to the saturator 8 together with the ammonia through connection 9. Following separation of the hydrochloric acid gas in the saturator 8, the resulting gas mixture is passed through a caustic tower 10 and a water tower 11 to the compressor 12. In the caustic tower 10 the gas mixture is scrubbed with an aqueous solution of caustic soda circulated by means of pump 13 by which carbon dioxide, hydrochloric acid and any uncombined chlorine are removed. In the water tower 11 the gas mixture is scrubbed with water circulated by means of pump 14 by which any entrained caustic is removed. The argon content of the gas mixture supplied to the compressor 12 may approximate, for example, 10–12% of the total gas mixture. Any remaining ammonia is recovered in solution in water condensed by interstage cooling and separated in traps as in conventional compressor practice. The compressed gas mixture discharged from the compressor 12 is passed through the conventional oil trap 15 and a series of conventional pressure caustic bottles 16, 17 and 18 to the heat exchanger, or cooler, 19. Any remaining carbon dioxide is removed from the compressed gas mixture in this series of traps at the same time that this gas mixture is dried therein. The compressed gas mixture is cooled, in the heat exchanger 19, to a temperature approximating $-200°$ C., for example, and at this temperature is discharged into the fractionating column 20. The nitrogen and argon and any oxygen in the gas mixture are substantially completely liquefied and the neon and any hydrogen of the gas mixture remain gaseous. The neon concentrate is discharged through connection 21 and substantially pure nitrogen is discharged through connection 22, to the nitrogen holder from which supplies are withdrawn for ammonia synthesis for example. The argon concentrate is discharged through connection 23. The operation of the fractionating column may be regulated, for example, so that this argon concentrate comprises argon and nitrogen in proportions corresponding to 86% and 14% respectively, the so-called commercial 86% argon, from which any oxygen present can be separated by conventional methods. Or the operation of the fractionating column may be regulated so that the argon concentrate comprises a higher percentage of argon.

Instead of supplying water to the saturator 8 with ammonia supplied through connection 9, or instead of supplying water directly to the saturator 8, the gas mixture escaping from this saturator may be scrubbed with the water to be supplied to the saturator for the removal of any hydrochloric acid or ammonia present.

The ammonium chloride liquor from the saturator 8 is supplied through connection 24 to the evaporator 25 in which it is concentrated, the concentrated liquor is cooled and ammonium chloride crystallized therefrom in the cooler and mixer 26, the crystallized ammonium chloride is centrifuged in the centrifuge 27 and thereafter dried in the drier 28. Mother liquor separated in the cooler and mixer 26 and the centrifuge 27 is returned to the saturator 8 through the connection 29.

Referring to Fig. 2, in which the same reference characters with a prime appended are used to designate the same or corresponding parts, the gas mixture from the gas holder 4' is supplied through caustic tower 10' and water tower 11' to the compressor 12'. The argon content of the gas mixture suppplied to the compressor 12' may approximate for example, 3+% and the hydrogen content 65% of the total gas mixture. The gas mixture compressed in the compressor 12' is cooled in the heat exchanger 19' to a temperature approximating $-200°$ C., for example, and at this temperature is discharged into the fractionating column 20'. The hydrogen, present in larger proportion than any other constituent, remains gaseous and is discharged through connection 21' with the neon. This gas mixture may be supplied either to the hydrogen holder or to the mixed gas holder from which the supplies are withdrawn for ammonia synthesis for example. This neon containing gas mixture may be so recirculated through the ammonia synthesis without interfering with the ammonia synthesis until the neon content of the gas mixture approximates 5% at which point the gas mixture may be withdrawn for recovery of the neon. The neon may be recovered by burning the hydrogen out of this gas mixture, with oxygen for example. The nitrogen is discharged from the fractionating column through connection 22' and the argon concentrate through connection 23'. Any hydrogen contaminating the argon concentrate can be removed therefrom by burning, with oxygen for example, or by combination, with hot copper oxide for example.

The same general technique used in the liquefaction and fractionation of air for the production of oxygen and nitrogen is useful in liquefying and fractionating the gas mixtures involved in carrying out this invention.

Having described my invention, I claim:

1. The production of gases of the group comprising argon and neon as by-products of the synthesis of ammonia from atmospheric nitrogen, by burning the hydrogen in the residual gas mixture remaining after separation of ammonia and containing hydrogen nitrogen, argon and neon, with chlorine, removing the hydrochloric acid so produced from the resulting gas mixture, compressing and cooling the remaining gases to liquefy the nitrogen and argon, separating the neon therefrom and fractionating the remaining gases to separate the argon from the nitrogen.

2. The production of gases of the group comprising argon and neon as by-products of the synthesis of ammonia from atmospheric nitrogen, by burning the hydrogen in the residual gas mixture remaining after separation of ammonia and containing hydrogen, nitrogen, argon and neon, with chlorine, combining the hydrochloric acid so produced with ammonia and separating the ammonium chloride so formed from the gas mixture, compressing and cooling the remaining gases to liquefy the nitrogen and argon, separating the neon therefrom and fractionating the remaining gases to separate the argon from the nitrogen.

In testimony whereof I affix my signature.

ELAM C. CURTIS.